United States Patent
Tamura

[19]

[11] Patent Number: 5,941,199

[45] Date of Patent: Aug. 24, 1999

[54] WALKING JACKET FOR CATS

[75] Inventor: Motoko Tamura, Mountain View, Calif.

[73] Assignee: Metropolitan Pet, Mountain View, Calif.

[21] Appl. No.: 08/941,721

[22] Filed: Oct. 1, 1997

[51] Int. Cl.[6] .......................... A01K 13/00; A01K 27/00
[52] U.S. Cl. ..................... 119/850; 119/856; 119/907
[58] Field of Search ..................... 119/850, 856, 119/907

[56] References Cited

U.S. PATENT DOCUMENTS

| | | | |
|---|---|---|---|
| 2,826,172 | 3/1958 | Buckle et al. | 119/850 |
| 3,248,852 | 5/1966 | Schwartz | 119/850 |
| 3,999,521 | 12/1976 | Puiello | 119/850 |
| 4,345,548 | 8/1982 | Krebs et al. | 119/850 |
| 4,530,309 | 7/1985 | Collins | 119/850 |
| 5,443,037 | 8/1995 | Saleme | 119/850 |
| 5,471,953 | 12/1995 | Sporn | 119/850 |
| 5,503,113 | 4/1996 | Knight | 119/850 |
| 5,511,515 | 4/1996 | Brown et al. | 119/850 |
| 5,537,954 | 7/1996 | Beghly et al. | 119/850 |

*Primary Examiner*—Michael J. Carone
*Assistant Examiner*—Fredrick T. French, III

[57] ABSTRACT

An improved harness for restraining cats and small animals comfortably and safely by means of an L-shaped fabric portion (16), an upper girth strap (28) and a lower girth strap (26). The L-shaped fabric portion (16) curves gently around one side and underneath the cat's stomach thereby creating a soft but strong restraint. The collar portion (10) when adjusted properly prevents the cat from backing out of the walking jacket and thereby prevents escape.

4 Claims, 3 Drawing Sheets

WALKING JACKET FOR CATS

BACKGROUND

1. Field of Invention

This invention relates to a harness for cats, specifically for the attachment of a cat to a leash for the purpose of walking, exercise or restraint.

2. Description of Prior Art

Cats, in the past, have generally not been leashed but have been given the freedom to wander. More and more, however, cats are confined to the indoors for their safety and protection. In addition, it is sometimes required to leash a cat to transport it or travel with it. It is also useful to have a safe means of restraining a cat when administering medication, treating wounds or grooming.

Cats are unique both physically and psychologically and require special consideration when restrained by means of a collar or harness. Physically, cats are extremely flexible and are able to twist and turn in order to escape many restraints. Psychologically, cats are highly sensitive and require gentle handling. It is useful to have a harness that addresses both the need to be physically restrictive and the need to be psychologically reassuring.

Products currently on the market consist of modified dog collars and harnesses. Collars are unsatisfactory because of the delicate nature of cats' necks and can be extremely dangerous when pulled abruptly or with force. Harnesses generally consist of two types known as the H-harness and the figure-8 harness. The H harness is so-called because of its similarity to the capital letter H and consists of a collar and a girth strap. The figure-8 harness resembles the figure 8 and consists of a loop around the neck and a loop around the girth which meet in the center. Neither shape is satisfactory physically because the straps can pull and bind causing discomfort. In addition, the figure-8 harness is easy for a cat to back out of resulting in a lost cat. Neither shape addresses the psychological need of a cat to be handled gently and be reassured since they consist of thin straps. Attempts to restrain or walk a cat with these harnesses often results in failure since the psychological and physical needs of the cat are not addresses. Cats will often refuse to move or will quickly escape the restraint.

Several types of harnesses have been proposed to solve this problem. All the harnesses previously known suffer from a number of disadvantages:

(a) The harnesses are easy for a cat to place its head down and back out of the straps.
(b) The harnesses consists of thin straps that can cause pain and stress to cats.
(c) The harnesses do not address the psychological requirements of cats for comfort and security

OBJECTS AND ADVANTAGES

Several objects and advantages of the present invention are:

(a) to provide a harness that is wrapped under and around a cat's body from one side to the other.
(b) to provide a harness that is generally impossible for a cat to escape from.
(c) to provide a harness that enables a person to gently restrain a cat when required.
(d) to provide a harness that is psychologically reassuring for a cat.
(e) to provide a harness that is easily and quickly put on and taken off of a cat.
(f) to provide a harness that consist of few parts that are readily available, can be made from a wide range of materials and are easy and inexpensive to manufacture.
(g) to provide a harness that is adjustable over a wide range in both the collar and girth portions to comfortably fit many size cats.

DRAWING FIGURE

In the drawings, closely related figures have the same number but different alphabetic suffixes.

Reference Numerals In Drawings

| | |
|---|---|
| 10 female element of buckle for collar | 12 collar |
| 14 male element of buckle for collar | 16 fabric "L" shaped body |
| 18 ring for leash attachment | 20 female element of buckle for upper girth strap |
| 22 outer keeper for girth strap | 24 male element of buckle for upper girth strap |
| 26 lower girth strap | 28 upper girth strap |
| 30 triglide for collar | 32 triglide for upper girth strap |
| 34 triglide for lower girth strap | 36 inner keeper for girth strap |
| 38 female element of buckle for lower girth strap | 40 male element of buckle for lower girth strap |

DESCRIPTION

Figure 1:
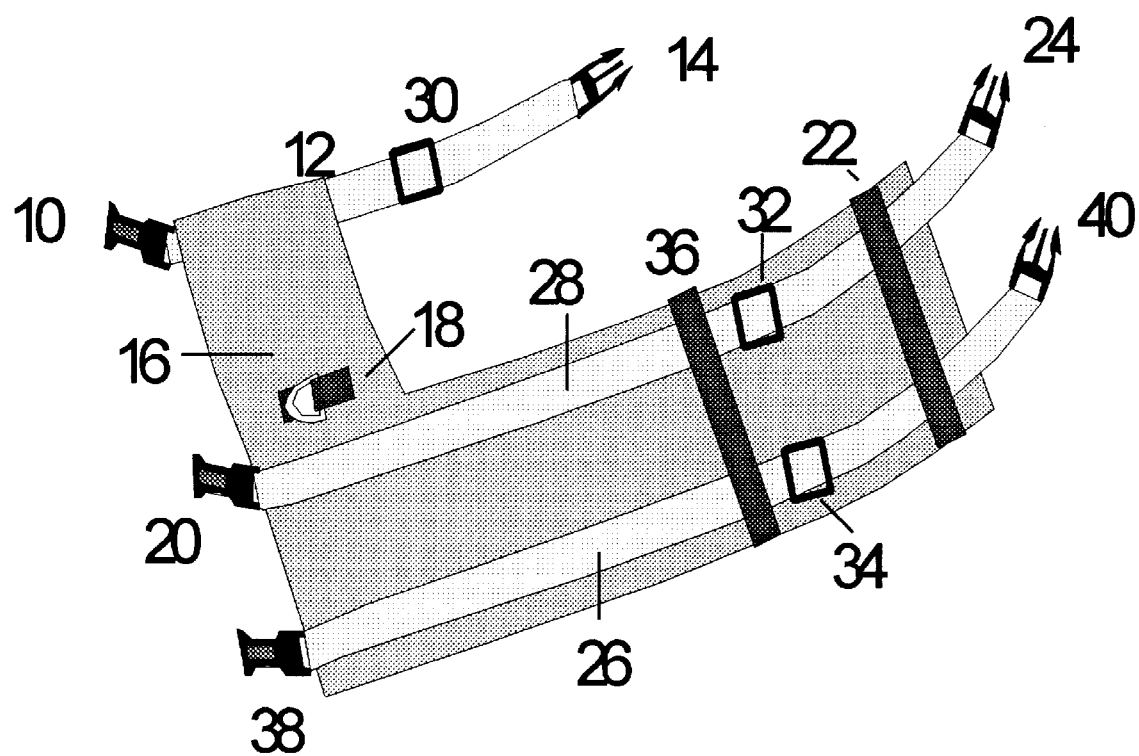
FIG. 1 shows a walking jacket unbuckled and laid flat as it would appear from above.

Typical embodiments of a walking jacket are illustrated in FIG. 1. Fabric portion 16 is attached by way of sewing or adhesion to collar 10, girth 26 and girth 28. In the preferred embodiment, ⅝" wide nylon webbing can be used as the flexible material in collar 10, girth 26 and keeper 22. However, the flexible material can consist of elastic, bungee cord, ribbon, rope, cotton webbing, leather, vinyl, fabric, etc. The material must be strong enough to safely hold the animal. In the preferred embodiment, collar 10 and girth 26 and girth 28 are independently adjustable as to their circumference by means of triglides. However, any, some or all of these elements may be non-adjustable. In the preferred embodiment, buckles are ⅝" concave, nylon parachute clips. However, such closures can consist of hook-and-loop, eyelet-and-buckle, friction-buckle, etc. In the preferred embodiment, slides are ⅝" nylon triglides. However, the slides can be made of steel, nickel, aluminum, plastic or other materials.

OPERATION

Figure 2:
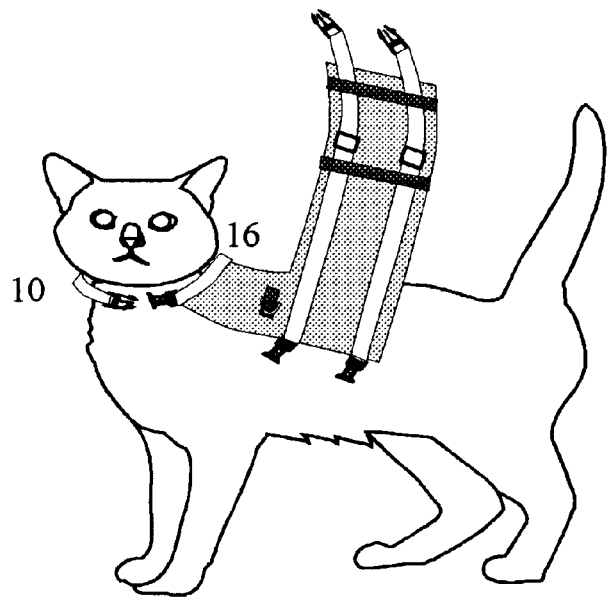
FIG. 2 shows a similar walking jacket as it would appear on a cat. The side illustrated is the side with the female elements of the buckles.
Figure 3:
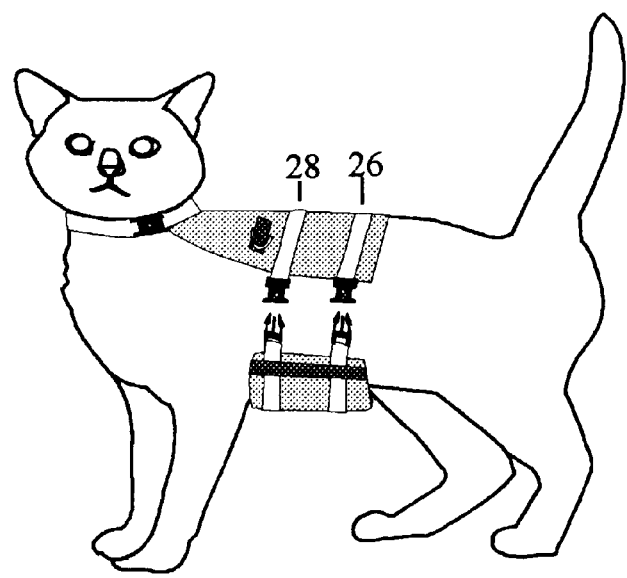
FIG. 3 shows a similar walking jacket as it would appear on a cat. The side illustrated is the side with the male elements of the buckles.

A person first places walking jacket on the cat as follows (FIG. 2). Buckles are opened by pressing on the prongs of male elements 14, 24, 40 to release them from female elements 10, 20 and 38. Collar 10 is placed around the cat so that the fabric portion 16 rests on the cat's back and the upper and lower girth straps hang down the cat's side. The fabric portion 16 is then adjusted to curve underneath the cat's stomach (FIG. 3). The collar 10 and the girth straps 26 and 28 are closed by means of the pressing the male elements 14, 24, 40 into the female elements 10, 20 and 38. Slides 30, 32 and 34 are used to adjust the circumference of collar 10, upper girth strap 28 and lower girth strap 26. Collar 10 is adjusted so that it cannot slip over a cat's ears. If collar 10 cannot slip over a cat's ears then the cat cannot escape the walking jacket.

Figure 4:
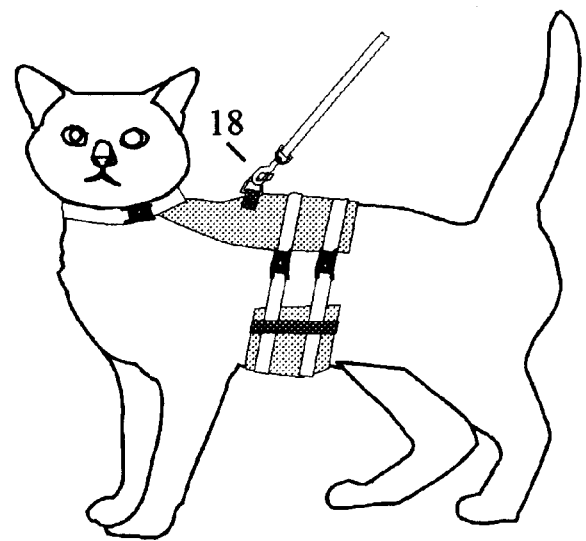
FIG. 4 shows a similar walking jacket wherein a leash is attached to it.
Figure 5:
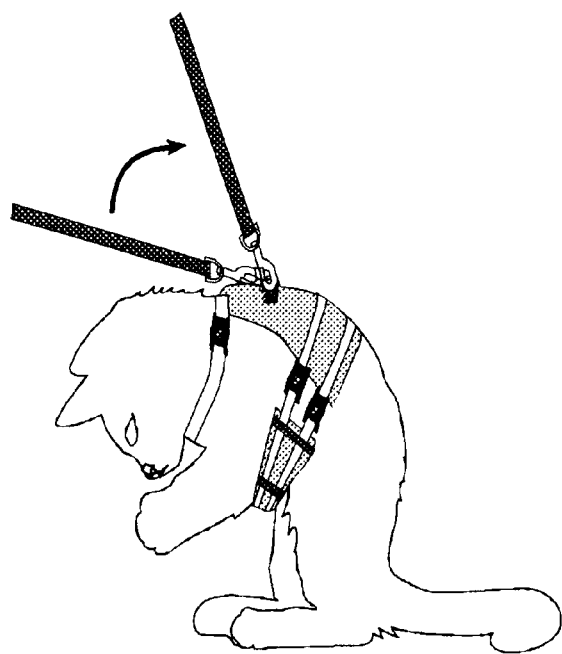
FIG. 5 shows a similar walking jacket showing the leash swiveling.

A leash is then attached (FIG. 4) to the leash ring 18. The cat may attempt to back out of the walking jacket (FIG. 5) by lowering its head and attempting to pull collar 10 over its head. With collar 10 adjusted properly the cat is unable to do so and is therefore securely restrained.

CONCLUSION, RAMIFICATIONS, AND SCOPE OF INVENTION

Accordingly, the reader will see that the walking jacket of this invention can be used to easily, safely and reassuringly restrain a cat or small animal. The L-shaped fabric portion supports the stomach and ribs of the cat providing a secure and comforting means of restraint that is well suited to a cat's delicate nature. The walking jacket is useful for restraining as well as walking a cat. It permits an individual to exercise a cat. For all the usefulness of the harness of this invention, it is easy and economical to make from a wide variety of commonly available materials.

While the description above contains many specifics, these should not be construed as limiting the scope of the invention but merely provide examples of preferred embodiments of this invention. The attachment points of the chest and girth to each other, the length of each of the major portions as well as the exact materials of the leash and harness may vary widely depending on the intended application.

Thus the scope of the invention should be determined by the appended claims and their legal equivalents, rather than by the examples given.

I claim:

1. A harness for a cat comprising:

(a) an L-shaped fabric portion having a short leg portion and a long leg portion (b) a short leg of the L-shaped fabric being fixedly attached to an adjustable collar (c) a long leg of the L-shaped fabric capable of partially encircling the animals abdomen between the front legs and the rear legs (d) the long leg of the L-shaped fabric having fixedly attached thereto an adjustable upper girth strap and an adjustable lower girth strap, said straps capable of completely encircling the animals abdomen (e) the adjustable collar and adjustable upper and lower girth straps having attaching means for attaching to each of their respective ends and for securing the fabric portion about the animal's abdomen (f) the long leg of the L-shaped fabric further having fixedly attached keepers for securing the girth straps in their respective locations, said keepers attached to the L-shaped fabric across the width of the fabric running perpendicular to the longitudinal axis of the long leg.

2. A harness for a cat or small animal as claimed in claim 1 additionally comprising an attaching means for attaching a leash to the short leg of the L-shaped fabric portion between the collar and the long leg of the L-shaped fabric portion, said attaching means being a ring.

3. A harness for a cat or small animal as claimed in claim 1 wherein said attaching means for attaching the respective ends of the adjustable collar and adjustable girth straps selected from the group consisting of a hook and loop or an eyelet and buckle or a friction buckle attachment.

4. A harness for a cat as claimed in claim 1 wherein said adjustable collar and girth straps are made of materials selected from the group consisting of elastic, bungee cord, ribbon, cotton webbing, leather, vinyl, or fabrics.

\* \* \* \* \*